US010199781B2

(12) United States Patent
Deatherage

(10) Patent No.: US 10,199,781 B2
(45) Date of Patent: Feb. 5, 2019

(54) RETRACTABLE TRAILER ELECTRICAL CONNECTION SYSTEM

(71) Applicant: Broox Deatherage, Globe, AZ (US)

(72) Inventor: Broox Deatherage, Globe, AZ (US)

(*) Notice: Subject to any disclaimer, the term of this patent is extended or adjusted under 35 U.S.C. 154(b) by 0 days.

(21) Appl. No.: 15/861,652

(22) Filed: Jan. 3, 2018

(65) Prior Publication Data

US 2018/0191108 A1  Jul. 5, 2018

Related U.S. Application Data

(60) Provisional application No. 62/441,842, filed on Jan. 3, 2017.

(51) Int. Cl.
| | |
|---|---|
| *H01R 13/72* | (2006.01) |
| *B62D 63/08* | (2006.01) |
| *B65H 75/42* | (2006.01) |
| *H02G 11/00* | (2006.01) |
| *B60D 1/62* | (2006.01) |
| *B65H 75/44* | (2006.01) |
| *H02G 11/02* | (2006.01) |

(52) U.S. Cl.
CPC .............. *H01R 13/72* (2013.01); *B60D 1/62* (2013.01); *B62D 63/08* (2013.01); *B65H 75/425* (2013.01); *B65H 75/4431* (2013.01); *H02G 11/00* (2013.01); *H02G 11/02* (2013.01); *B65H 2701/34* (2013.01); *H01R 2201/26* (2013.01)

(58) Field of Classification Search
CPC .............. B65H 75/425; B65H 75/4415; B65H 75/4418; B65H 75/4423; B65H 75/4426; B65H 75/4428; B65H 75/4431; B65H 75/4442; B65H 75/4471
USPC .......................... 439/4; 191/12, 12.2, 12.2 R
See application file for complete search history.

(56) References Cited

U.S. PATENT DOCUMENTS

| | | | | | |
|---|---|---|---|---|---|
| 4,006,952 | A | * | 2/1977 | Puckett ................. | H02G 11/02 174/541 |
| 4,146,282 | A | * | 3/1979 | Gay ....................... | H02G 11/02 439/34 |
| 4,384,688 | A | * | 5/1983 | Smith .................... | B65H 75/4434 191/12.2 R |
| 4,904,205 | A | * | 2/1990 | Rice ...................... | H01R 13/72 191/12.4 |

(Continued)

*Primary Examiner* — Harshad C Patel
(74) *Attorney, Agent, or Firm* — The Keith Miller Law Group; Keith Miller

(57) ABSTRACT

A Retractable Electrical Trailer Connection System comprising a retractable reel assembly removably mounted to a trailer; an electrical cable, further comprising a first end and a second end; an electrical connector electrically coupled to the electrical cable second end; a guide aperture extending outwardly from the retractable reel assembly, and a stop mechanism removably attached to the electrical cable between the guide aperture and the electrical connector. The electrical cable first end is electrically coupled to the trailer and is wound about a center spool of the retractable reel assembly where the electrical cable second end extends outwardly through the guide aperture. The electrical connector is configured to electrically couple the electrical cable to a standard receptacle located on a rear side of a tow vehicle. The stop mechanism is preferably structured to move along the electrical cable and lock into place.

6 Claims, 6 Drawing Sheets

(56) References Cited

U.S. PATENT DOCUMENTS

| | | | | |
|---|---|---|---|---|
| 5,129,828 A * | 7/1992 | Bass | ............... | B60D 1/62 |
| | | | | 191/12.2 R |
| 5,445,252 A * | 8/1995 | McKee | ............... | B60L 11/1816 |
| | | | | 191/12 C |
| 5,669,471 A * | 9/1997 | Unze | ............... | H01R 13/72 |
| | | | | 191/12.2 R |
| 5,855,262 A * | 1/1999 | Jackson | ............... | B60L 11/1816 |
| | | | | 191/12.4 |
| 6,780,021 B1 * | 8/2004 | Owen | ............... | H01R 13/72 |
| | | | | 439/35 |
| 7,172,150 B1 * | 2/2007 | Hutchison, II | ............... | B65H 75/4449 |
| | | | | 191/12.2 R |
| 7,264,478 B1 * | 9/2007 | Downing | ............... | B65H 75/425 |
| | | | | 191/12.4 |
| 7,959,444 B2 * | 6/2011 | Corless | ............... | H01R 13/72 |
| | | | | 439/35 |
| 7,973,516 B2 * | 7/2011 | Flack | ............... | B60L 11/1816 |
| | | | | 174/61 |
| 8,561,737 B2 * | 10/2013 | Ichikawa | ............... | B60L 11/123 |
| | | | | 180/65.21 |
| 8,960,392 B2 * | 2/2015 | Ichikawa | ............... | B60K 6/445 |
| | | | | 191/12.4 |

* cited by examiner

RETRACTABLE TRAILER ELECTRICAL CONNECTION SYSTEM

CROSS-REFERENCE TO RELATED APPLICATION

This application claims the benefit under Title 35, U.S.C. § 119(e) of U.S. Provisional Application Ser. No. 62/441,842 filed Jan. 3, 2017.

BACKGROUND OF THE INVENTION

The present invention relates generally to the field of electrical connections for trailers for use when towing various types of trailers behind a vehicle. In particular, the present invention relates to an adjustable trailer electrical connection system designed to allow for a flexible electrical connection of the trailer's electrical system to a tow vehicle allowing greater flexibility during maneuvering.

When pulling a trailer behind a vehicle, it is often desired or even legally necessary to connect electrical equipment on the trailer to the electrical system of the vehicle. Electrical equipment on the trailer typically includes taillights, brake lights, turn signals, license plate lights, running lights, etc. Some trailers are also equipped with electric brakes and/or other electrical items. The wiring on the trailer will have plug that fits in a socket on the vehicle, or vice versa, so that all of the electrical connections can be made easily at once.

Depending on the positioning of the plugs in the wiring, there may be excess wiring which can hang down from the trailer or between the vehicles. Not only is this unsightly, it can be hazardous if the wire were to catch on something as the vehicle pulls the trailer down the road. It could result in the wiring becoming disconnected which would cause loss of lights, etc., and possibly the trailer brakes.

Such interconnecting plug receptacles are commonly used on a great variety of trailers, such as utility, horse, livestock, automotive, recreational and bumper pull trailers. Other rewind trailer-like connectors are disclosed in various patents, however they do not include a stop mechanism such that a set length of cable from being pulled back into the retractable reel for maneuvering. Therefore, there is constant tension on the electrical cable which can cause the electrical cable to be pulled out of the receptacle.

The present invention solves the above problems by providing an electrical cable on a retractable reel assembly with a stop mechanism designed to fit onto the electrical cable to prevent the electrical cable from having constant tension on the connection to the tow vehicle due to being pulled into and out of the retractable reel assembly, thus preventing the possibility of pulling the electrical cable connection out of the tow vehicle. Additionally, the present invention is easily mounted onto the trailer such that any tow vehicle capable of towing the trailer can be used interchangeably.

Any discussion of prior art throughout the specification should in no way be considered as an admission that such prior art is widely known or forms part of the common general knowledge in the field.

BRIEF SUMMARY OF THE INVENTION

According to the present invention there is provided a Retractable Electrical Trailer Connection System comprising a retractable reel assembly removably mounted to a trailer; an electrical cable, further comprising a first end and a second end; an electrical connector electrically coupled to the electrical cable second end; a guide aperture extending outwardly from the retractable reel assembly, and a stop mechanism removably attached to the electrical cable between the guide aperture and the electrical connector. Preferably, the electrical cable first end is electrically coupled to the trailer. Preferably, the electrical cable is wound about a center spool of the retractable reel assembly and the electrical cable second end extends outwardly through the guide aperture. Preferably, the electrical connector is configured to electrically couple the electrical cable to a standard receptacle located on a rear side of a tow vehicle. Lastly, the stop mechanism is preferably structured to move along the electrical cable and lock into place.

According to one object and feature of the present invention there is provided a stop mechanism further comprising a top housing, a bottom housing, an internal block, and at least one spring.

Another object and feature of the present invention is that the internal block further comprises a central bore structured to have the electrical cable fit through, a push button on a top surface, and at least one peg on a bottom surface structured to accept the at least one spring.

Another object and feature of the present invention is that the stop mechanism is large enough to prevent the stop mechanism passing through the guide aperture of the retractable reel assembly.

BRIEF DESCRIPTION OF THE DRAWINGS

The preferred embodiment of the present invention will now be described, by way of example only, with reference to the accompanying drawings in which.

DETAILED DESCRIPTION OF THE INVENTION

The foregoing and other objectives, features, and advantages of the invention will be more readily understood upon consideration of the following description of the invention taken in conjunction with the accompanying drawings.

Figure 1:
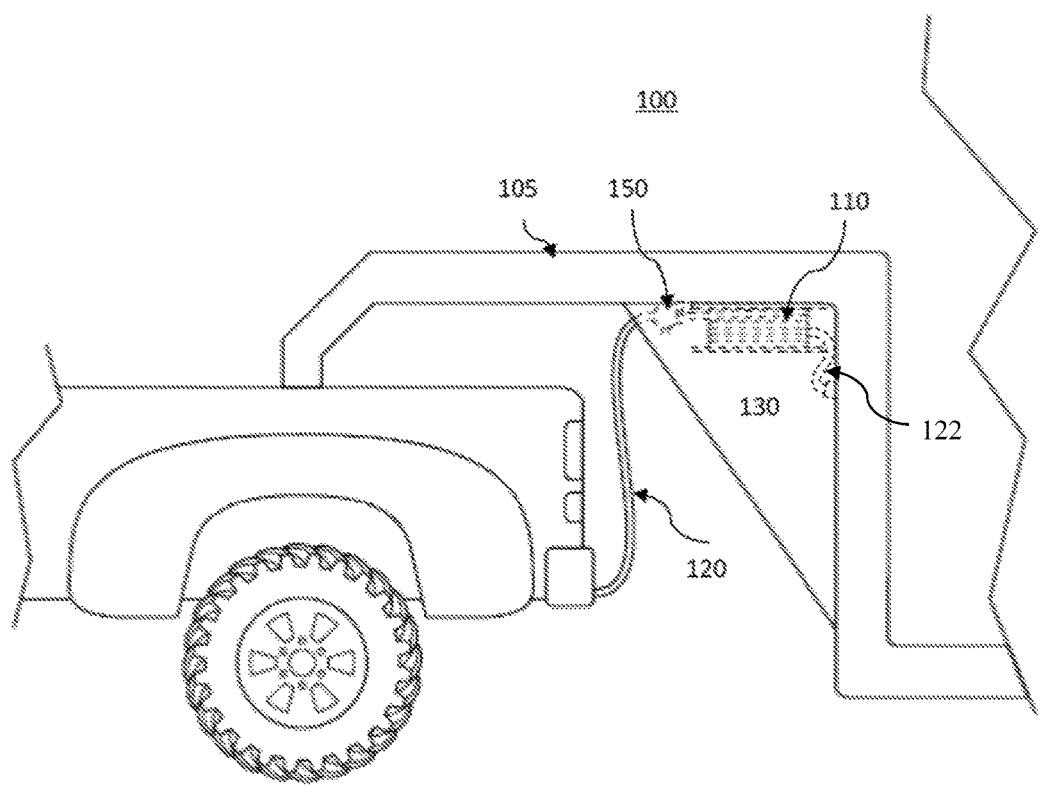
FIG. 1 shows a side view of a Retractable Trailer Electrical Connection System according to a preferred embodiment of the present invention.

Now referring to the drawings, FIG. 1 shows the invention described herein is an adjustable electrical trailer connection system 100 comprising a retractable reel assembly 110 removably mounted to a trailer 105; an electrical cable 120, further comprising a first end 122 and a second end 124; an electrical connector 130 electrically coupled to the electrical cable second end 124; a guide aperture 140 extending outwardly from the retractable reel assembly; and a stop mechanism 150 removably attached to the electrical cable between the guide aperture and the electrical connector. The electrical cable first end 122 is preferably electrically coupled to the trailer 105 that the retractable reel assembly is removably mounted to.

As further shown in FIG. 1, the retractable reel assembly 110 is preferably mounted on a front portion of the trailer 105 in such a way that the electrical cable 120 can be unwound from the retractable reel assembly 110 and the electrical connector 130 plugged into the receptacle located on the rear area of the tow vehicle. The retractable reel assembly 110 is preferably positioned on the trailer 105 such that the guide aperture 140 is facing toward the tow vehicle.

Figure 2:
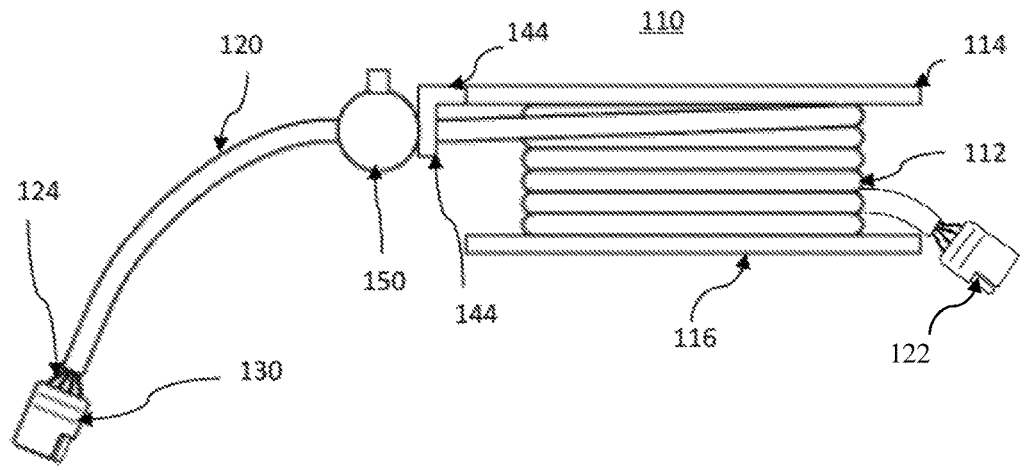
FIG. 2 shows a side view of a Retractable Trailer Electrical Connection System according to a preferred embodiment of the present invention.
Figure 3:
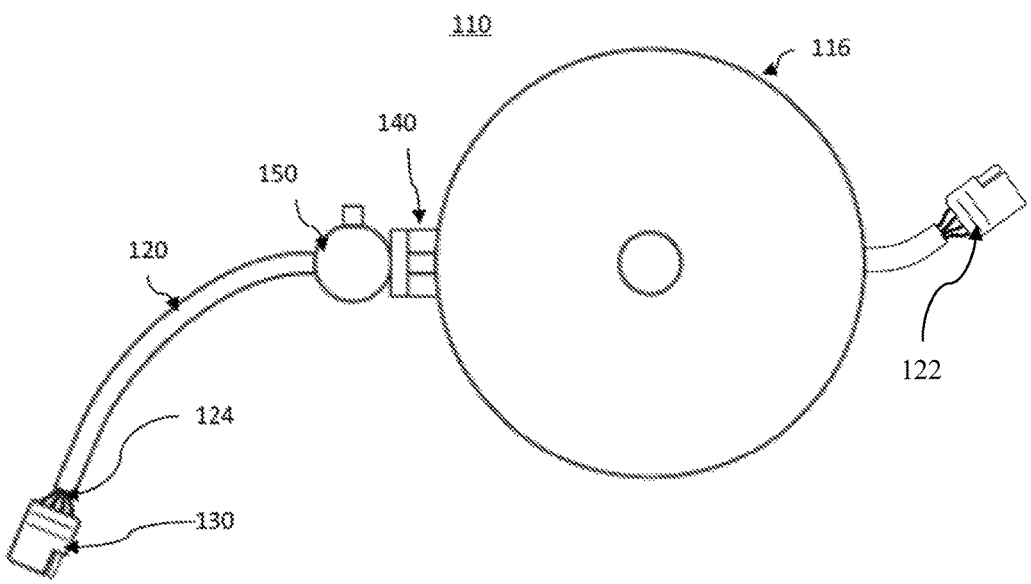
FIG. 3 shows a top view of a Retractable Trailer Electrical Connection System according to a preferred embodiment of the present invention.

As shown in FIGS. 2 and 3, the retractable reel assembly 110 preferably further comprises a spool 112 where the electrical cable 120 is wound around. The spool is preferably round with a top plate 114 and a bottom plate 116 preferably coupled to the spool to keep the electrical cable on the spool. The top plate and bottom plate are preferably angled slightly to allow the electrical cable to be consistently wound around the spool.

As further shown in FIGS. 2 and 3, the retractable reel assembly 110 preferably further comprises a guide aperture 140 preferably mounted onto the top plate or the bottom plate of the spool. The guide aperture further comprises a horizontal extension 142 that preferably attaches to the top plate and extends outwardly from the top or bottom plate. The horizontal extension preferably ends in a ninety-degree tab 144 further comprising a hole through which the electrical cable extends through. The hole in the guide aperture 140 is preferably lined with a soft material to prevent the electrical cable outer sleeve from abrading and providing a smooth surface for the electrical cable to move against.

Figure 4:
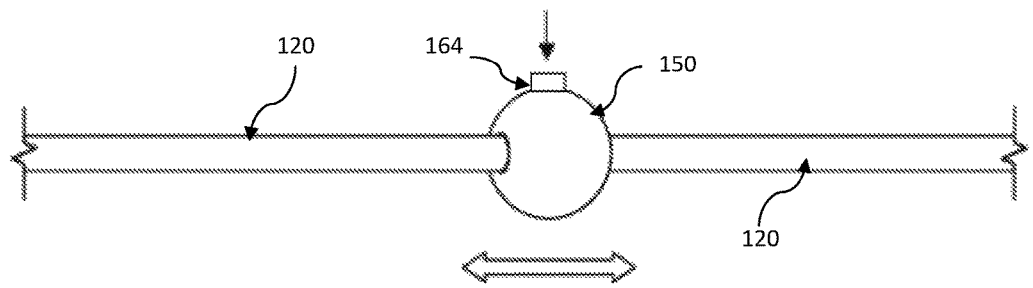
FIG. 4 shows a side view of a stop mechanism for a Retractable Trailer Electrical Connection System according to a preferred embodiment of the present invention.

As shown in FIG. 4, the stop mechanism 150 is preferably circular in shape with a circular bore extending completely through the housing. The stop mechanism is designed such that when the push button 156 is depressed, an internal block moves downward against at least one spring to align a bore in the internal block with the housing circular bore to allow the stop mechanism to be moved along the electrical cable 120 to adjust where the stop mechanism is located along the electrical cable. When the push button 164 is released, the internal block moves upward with the pressure of the at least one spring to offset the block bore with the housing circular bore to prevent the stop mechanism from being moved along the electrical cable 120.

As further shown in FIGS. 2 and 3, the stop mechanism 150 is preferably larger than the hole in the guide aperture 140 such that the electrical cable 120 cannot be further retracted onto the retractable reel assembly 110 when the stop mechanism 150 is locked in place and is against the guide aperture 140. Alternately preferably, the stop mechanism 150 can be any shape such that the overall size of the stop mechanism is larger than the guide aperture hole to prevent the stop mechanism from moving through the guide aperture hole and preventing the electrical cable from further retracting onto the retractable reel assembly 110.

Figure 5:
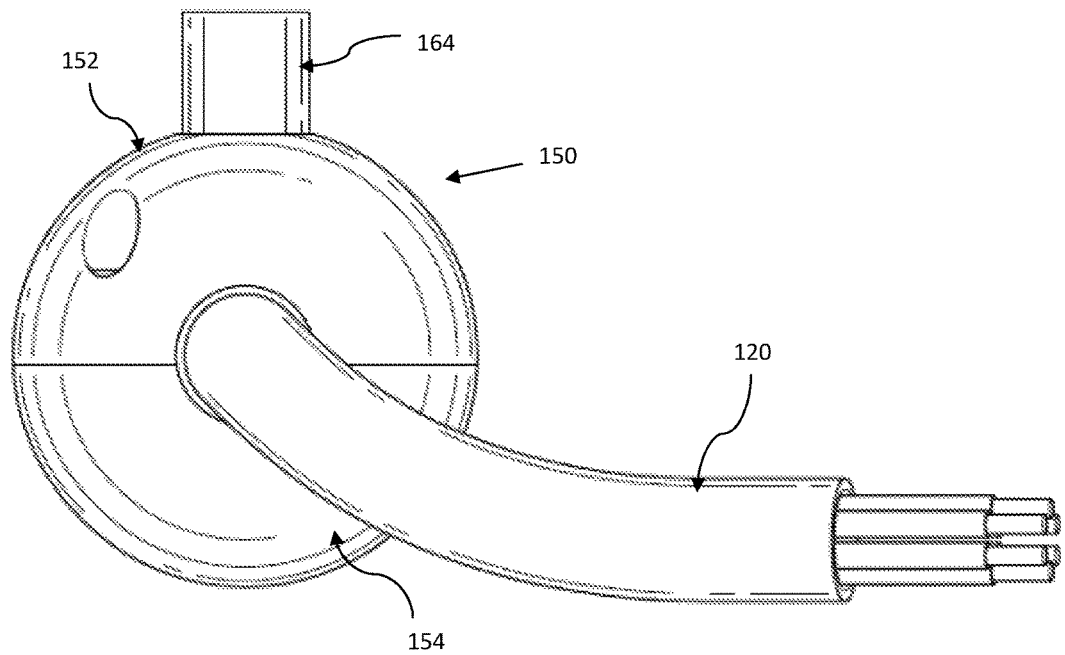
FIG. 5 shows an end view of the stop mechanism for a Retractable Trailer Electrical Connection System according to a preferred embodiment of the present invention.
Figure 6:
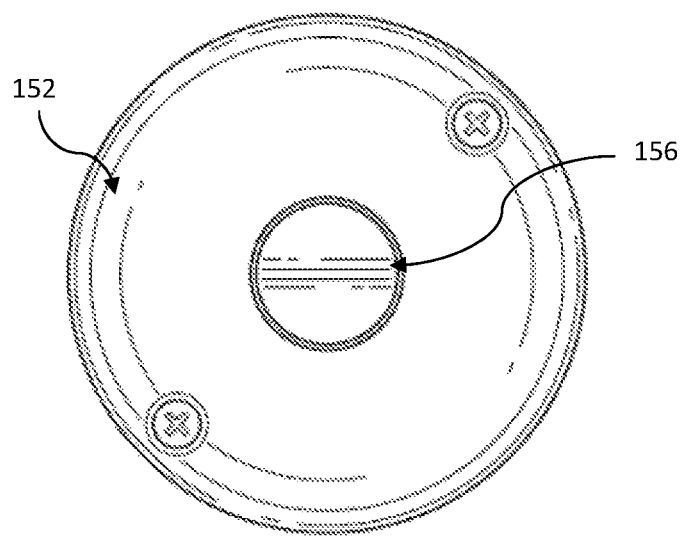
FIG. 6 shows a detailed top view of the stop mechanism for a Retractable Trailer Electrical Connection System according to a preferred embodiment of the present invention.
Figure 7:
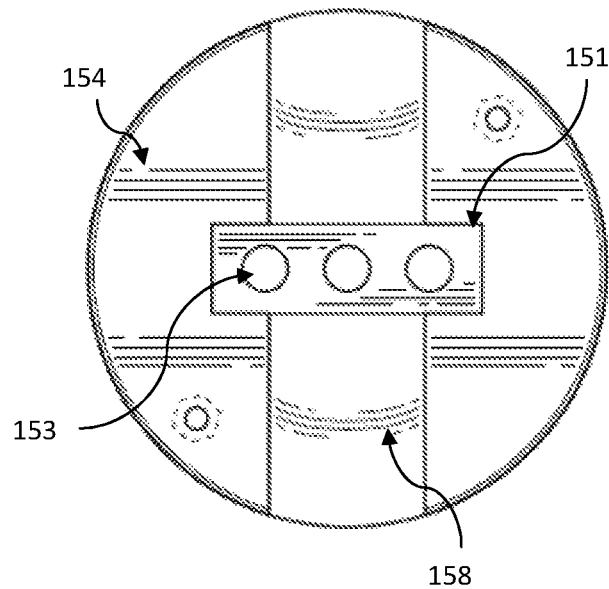
FIG. 7 shows a detailed inside view of a bottom half of the stop mechanism for a Retractable Trailer Electrical Connection System according to a preferred embodiment of the present invention.

As shown in FIGS. 5 to 7, the stop mechanism 150 further comprises a top housing 152 and a bottom housing 154 that are mechanically coupled together. The stop mechanism further comprises an internal block 160 and at least one spring 170. The internal block is preferably a rectangular block of material with a center bore 162. The internal block preferably further comprises a push button 164 at a top surface and at least one peg 166 on a bottom surface. The at least one peg is sized to allow the at least one spring 170 to fit onto the at least one peg 166.

The top housing 152 of the stop mechanism 150 preferably further comprises a concave channel structured to fit half of the electrical cable, a rectangular recess on the inside structured to accept the top half of the internal block 160, and a hole 156 through a top surface of the top housing. The hole 156 through the top housing of the stop mechanism is sized to allow the push button of the internal block to extend through.

As shown in FIG. 7, the bottom housing 154 of the stop mechanism further comprises a corresponding concave channel 158 designed to line up with the concave channel in the top housing of the stop mechanism to form a bore when mechanically coupled together, a rectangular recess 151 structured to accept a bottom portion of the internal block, and at least one receptacle 153 for the at least one spring to sit in. Preferably, the internal recesses in the stop mechanism top half and bottom half are elongated to allow the internal block to move up and down as the push button is depressed and released.

Figure 8A:
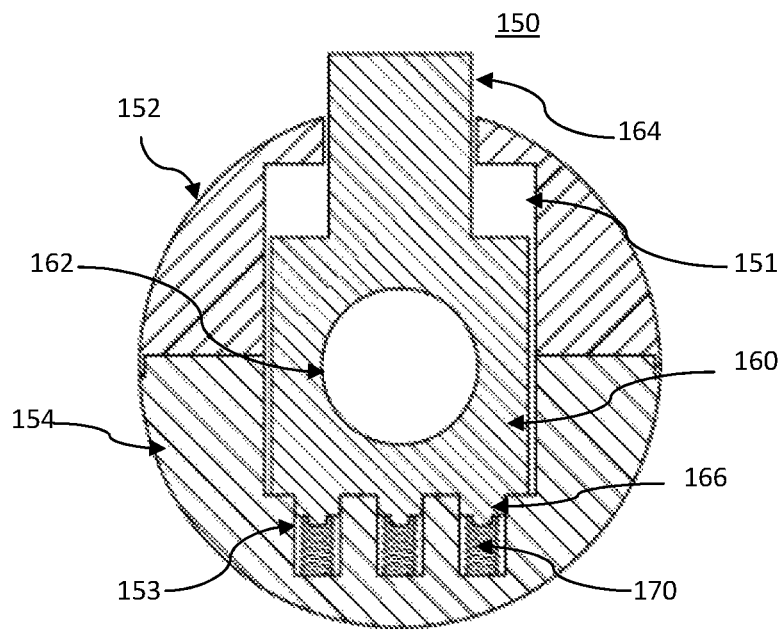
FIG. 8A shows a detailed cut-away view of the stop mechanism with the push button depressed for a Retractable Trailer Electrical Connection System according to a preferred embodiment of the present invention.
Figure 8B:
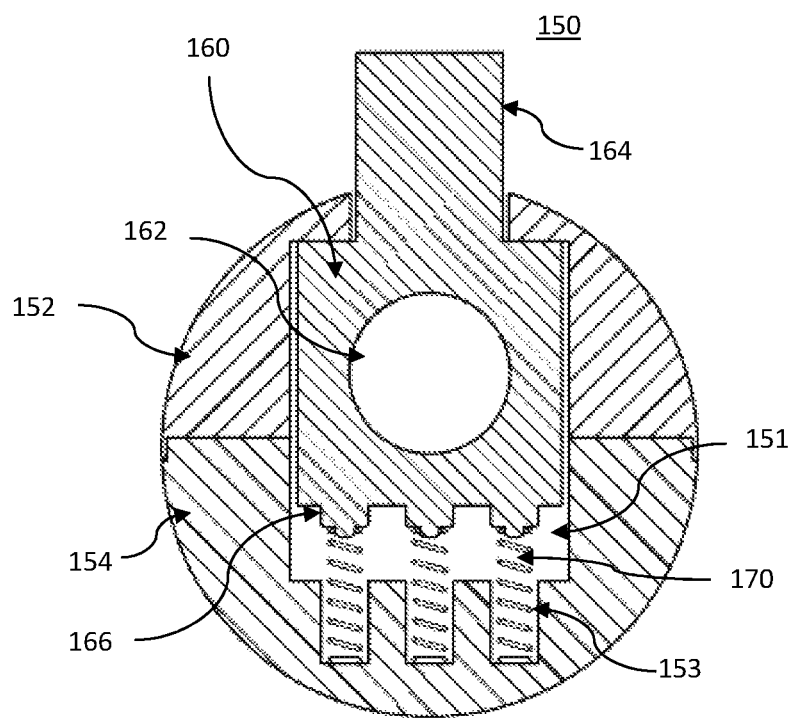
FIG. 8B shows a detailed cut-away view of the stop mechanism with the push button released for a Retractable Trailer Electrical Connection System according to a preferred embodiment of the present invention.

As shown in FIGS. 8A and 8B, when the stop mechanism 150 is assembled, the recesses 151 in the top housing 152 and the bottom housing 154 of the stop mechanism housing are structured to allow the internal block 160 to move up and down against the at least one spring 170 located in the at least one receptacle 153 in the bottom housing 154. When the push button 164 is pressed the internal block 160 is lowered such that the central bore 162 of the internal block is in line with the circular bore and the stop mechanism can be moved along the length of the electrical cable. When the push button is released the internal block is raised using the at least one spring and the central bore of the internal block is offset causing the electrical cable to be bent and, thus, the stop mechanism is no longer able to be moved locking the stop mechanism onto the electrical cable in place.

Figure 9:
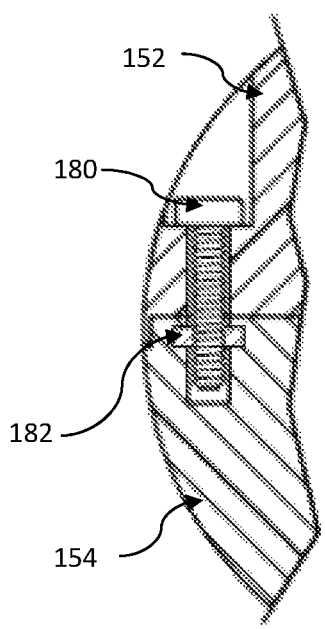
FIG. 9 shows a detailed cut-away view of the stop mechanism bottom and top half attachment for a Retractable Trailer Electrical Connection System according to a preferred embodiment of the present invention

As shown in FIG. 9, the top housing 152 and bottom housing 154 of the stop mechanism 150 are preferably mechanically coupled using at least one bolt 180 and nut 182. Preferably, the attachment area of the at least one bolt and nut are recessed such that the bolt 180 head does not extend beyond the outside surface of the stop mechanism 150. Preferably, the at least one nut 182 is also recessed. Alternately preferably, the nut is integral to the stop mechanism bottom housing 154. Although at least one bolt and nut are described herein, other methods for coupling the top housing to the bottom housing may be employed without limitation.

Although the present invention has been described by way of example, it should be appreciated that variations and modifications may be made without departing from the scope of the invention. Furthermore, where known equivalents exist to specific features, such equivalents are incorporated as if specifically referred to in this specification.

We claim:

1. A Retractable Electrical Trailer Connection System comprising:
    a retractable reel assembly removably mounted to a trailer;
    an electrical cable, further comprising a first end and a second end;
    an electrical connector electrically coupled to said electrical cable second end;
    a guide aperture on a support arm extending outwardly from said retractable reel assembly; and
    a stop mechanism removably attached to said electrical cable between said guide aperture and said electrical connector, wherein said stop mechanism further comprises a top housing, a bottom housing, and internal block, and at least one spring;
    wherein said electrical cable is wound about a center spool of said retractable reel assembly and said electrical cable second end extends outwardly through said guide aperture;
    wherein said electrical connector is configured to electrically couple to a standard receptacle located on a rear side of a tow vehicle; and
    wherein said stop mechanism is structured to move along said electrical cable and lock into place.

2. The Retractable Electrical Trailer Connection System of claim 1, wherein said top housing attaches to said bottom housing with at least connector.

3. The Retractable Electrical Trailer Connection System of claim 1, wherein said internal block further comprises a central bore, at least one peg on a bottom surface structured to accept said at least one spring, and a push button on a top surface.

4. The Retractable Electrical Trailer Connection System of claim 3, wherein said internal block is structured to move up and down against said at least one spring within a recess inside said stop mechanism.

5. The Retractable Electrical Trailer Connection System of claim 1, wherein said retractable reel assembly further comprises a housing fully covering said electrical cable.

6. The Adjustable Electrical Trailer Connection System of claim 1, wherein said stop mechanism is large enough to prevent said stop mechanism passing through said guide aperture.

* * * * *